(12) United States Patent
Goldsmith

(10) Patent No.: US 10,197,430 B2
(45) Date of Patent: Feb. 5, 2019

(54) VISUAL INDICATOR

(71) Applicant: Falcon Waterfree Technologies, LLC, Los Angeles, CA (US)

(72) Inventor: Edward Michael Goldsmith, Encino, CA (US)

(73) Assignee: FALCON WATERFREE TECHNOLOGIES, LLC, Los Angeles, CA (US)

( * ) Notice: Subject to any disclaimer, the term of this patent is extended or adjusted under 35 U.S.C. 154(b) by 309 days.

(21) Appl. No.: 14/289,520

(22) Filed: May 28, 2014

(65) Prior Publication Data

US 2015/0204710 A1     Jul. 23, 2015

Related U.S. Application Data

(60) Provisional application No. 61/929,127, filed on Jan. 20, 2014.

(51) Int. Cl.
| | |
|---|---|
| *A47K 11/12* | (2006.01) |
| *G01F 23/292* | (2006.01) |
| *E03C 1/28* | (2006.01) |
| *E03D 13/00* | (2006.01) |
| *G08B 21/20* | (2006.01) |
| *G08B 25/10* | (2006.01) |

(52) U.S. Cl.
CPC ............ *G01F 23/292* (2013.01); *A47K 11/12* (2013.01); *E03C 1/281* (2013.01); *E03D 13/007* (2013.01); *G08B 21/20* (2013.01); *G08B 25/10* (2013.01)

(58) Field of Classification Search
CPC ........ A47K 11/12; E03D 13/007; E03C 1/281
USPC ........ 4/114.1, 144.1, 144.2, 144.4, 462, 463, 4/314
See application file for complete search history.

(56) References Cited

U.S. PATENT DOCUMENTS

| | | | |
|---|---|---|---|
| 1,745,010 A | 1/1930 | Lamprecht |
| 2,675,823 A | 4/1954 | Langdon |
| (Continued) | | |

FOREIGN PATENT DOCUMENTS

| | | |
|---|---|---|
| CA | 2700702 | 4/2009 |
| CA | 2700704 | 4/2009 |
| (Continued) | | |

OTHER PUBLICATIONS

International Search Report and the Written Opinion of the International Searching Authority for PCT/US2014/039850; dated Oct. 27, 2014.

(Continued)

*Primary Examiner* — J. Casimer Jacyna
(74) *Attorney, Agent, or Firm* — Tope-McKay & Associates

(57) ABSTRACT

A visual indicator for denoting a fluid level in a throat portion of a waterless urinal cartridge is presented. The visual indicator comprises a fluid level indicator disposed in the throat portion of the cartridge. As material buildup occurs inside the cartridge, a corresponding rise in the fluid level in the throat of the cartridge may be seen relative to the indicator, indicating when the cartridge will need replacement. The visual indicator may comprise markings that indicate the level of fluid within the throat portion, reactive materials, or an electronic reader. The fluid level indicator may also be made visible by ultraviolet radiation.

5 Claims, 15 Drawing Sheets

(56) References Cited

U.S. PATENT DOCUMENTS

| | | | |
|---|---|---|---|
| 3,047,013 | A | 7/1962 | Baumbach |
| 3,871,231 | A * | 3/1975 | Ciarico ............... A61B 5/208 |
| | | | 600/584 |
| 3,967,645 | A | 7/1976 | Gregory |
| 4,241,017 | A * | 12/1980 | Balistreri ........... A61B 5/208 |
| | | | 4/144.1 |
| 4,518,014 | A | 5/1985 | McAlpine |
| 4,559,649 | A * | 12/1985 | Burnett ............ A61B 10/007 |
| | | | 4/144.1 |
| 4,574,400 | A | 3/1986 | Annowsky |
| 4,574,403 | A | 3/1986 | Dintemann et al. |
| 4,578,207 | A | 3/1986 | Holdt et al. |
| 4,595,346 | A | 6/1986 | Bozoyan |
| 4,683,071 | A | 7/1987 | Holdt et al. |
| 4,768,238 | A * | 9/1988 | Kleinberg ........ A61B 10/0051 |
| | | | 4/144.1 |
| 4,937,892 | A | 7/1990 | Syrenne |
| 5,193,585 | A | 3/1993 | Proffitt et al. |
| 5,409,315 | A * | 4/1995 | Evans ................ B65D 65/46 |
| | | | 383/1 |
| 5,581,823 | A | 12/1996 | Kuo |
| 5,604,937 | A | 2/1997 | Davenport |
| 5,606,995 | A | 3/1997 | Raftis |
| 5,711,037 | A | 1/1998 | Reichardt et al. |
| 5,727,593 | A | 3/1998 | Duer |
| 5,813,058 | A | 9/1998 | Quigley et al. |
| 6,009,567 | A | 1/2000 | Dean et al. |
| 6,053,197 | A | 4/2000 | Gorges |
| 6,105,916 | A | 8/2000 | Zlotnik et al. |
| 6,247,189 | B1 | 6/2001 | Dean et al. |
| 6,286,153 | B1 | 9/2001 | Keller |
| 6,401,266 | B1 | 6/2002 | Mitchell et al. |
| 6,425,411 | B1 | 7/2002 | Gorges |
| 6,640,356 | B1 | 11/2003 | Hans |
| 6,644,339 | B2 | 11/2003 | Gorges et al. |
| 6,701,541 | B2 | 3/2004 | Romagna et al. |
| 6,750,773 | B2 | 6/2004 | Higgins |
| 6,959,723 | B2 | 11/2005 | Gorges |
| 6,973,939 | B2 | 12/2005 | Georges et al. |
| 6,977,005 | B2 | 12/2005 | Erdmann et al. |
| D544,574 | S | 6/2007 | Cummings |
| 7,243,681 | B2 | 7/2007 | Dahm |
| 7,422,034 | B2 | 9/2008 | Dahm |
| 7,511,004 | B2 | 3/2009 | Cheung et al. |
| D598,523 | S | 8/2009 | McAlpine |
| D598,987 | S | 8/2009 | McAlpine |
| 7,571,741 | B2 | 8/2009 | Higgins |
| 7,575,022 | B2 | 8/2009 | Higgins |
| 7,636,957 | B2 | 12/2009 | Funari |
| 7,709,433 | B2 | 5/2010 | Veltman et al. |
| D618,322 | S | 6/2010 | Keller |
| D620,584 | S | 7/2010 | McAlpine |
| 7,757,312 | B2 | 7/2010 | Stack et al. |
| 7,900,288 | B2 | 3/2011 | Fima |
| 8,006,324 | B2 | 8/2011 | Ophardt et al. |
| 8,007,707 | B1 | 8/2011 | Brown et al. |
| D644,717 | S | 9/2011 | Larkin et al. |
| 8,234,723 | B2 | 8/2012 | Allen |
| 8,277,715 | B2 | 10/2012 | Arora et al. |
| 8,281,522 | B1 | 10/2012 | Kueng |
| 8,444,771 | B2 | 5/2013 | Leipold et al. |
| 8,485,216 | B2 | 7/2013 | Higgins |
| 8,510,875 | B2 * | 8/2013 | Helbig ................ A47K 11/12 |
| | | | 4/314 |
| 8,590,068 | B2 | 11/2013 | Stack et al. |
| 8,646,117 | B2 | 2/2014 | Avetisian |
| 8,739,320 | B1 * | 6/2014 | McTaggart ........... E03C 1/281 |
| | | | 4/144.1 |
| 2002/0069913 | A1 | 6/2002 | Gorges et al. |
| 2002/0116753 | A1 | 8/2002 | Mitchell et al. |
| 2002/0120981 | A1 | 9/2002 | Gorges |
| 2003/0089397 | A1 | 5/2003 | Georges |
| 2004/0010843 | A1 | 1/2004 | Erdmann et al. |
| 2004/0134534 | A1 | 7/2004 | Gorges et al. |
| 2004/0211267 | A1 | 10/2004 | Higgins |
| 2005/0229297 | A1 | 10/2005 | Higgins |
| 2005/0229971 | A1 | 10/2005 | Higgins |
| 2005/0247342 | A1 | 11/2005 | Higgins |
| 2006/0064805 | A1 | 3/2006 | Yamamoto et al. |
| 2006/0101565 | A1 | 5/2006 | Cummings |
| 2006/0118176 | A1 | 6/2006 | Ring et al. |
| 2006/0207005 | A1 | 9/2006 | Jenssen |
| 2006/0225195 | A1 | 10/2006 | Scholar |
| 2007/0006370 | A1 | 1/2007 | Schroder |
| 2007/0048247 | A1 | 3/2007 | Martin et al. |
| 2007/0083989 | A1 | 4/2007 | Higgins et al. |
| 2007/0186337 | A1 | 8/2007 | Emr |
| 2007/0209979 | A1 | 9/2007 | Helbig et al. |
| 2007/0257218 | A1 | 11/2007 | Bood et al. |
| 2008/0028504 | A1 | 2/2008 | Higgins et al. |
| 2008/0093845 | A1 | 4/2008 | Higgins |
| 2008/0295233 | A1 | 4/2008 | Fima |
| 2008/0256695 | A1 | 10/2008 | Allen |
| 2008/0269097 | A1 | 10/2008 | Cheung et al. |
| 2008/0303186 | A1 | 12/2008 | Lu |
| 2008/0313795 | A1 | 12/2008 | Lu |
| 2009/0165197 | A1 | 7/2009 | Seibt |
| 2009/0235443 | A1 | 9/2009 | Arora et al. |
| 2010/0024892 | A1 | 2/2010 | Higgins |
| 2010/0025509 | A1 * | 2/2010 | Matlin ................ G01F 23/292 |
| | | | 241/100 |
| 2010/0032593 | A1 * | 2/2010 | Yarbrough ........... B60P 3/228 |
| | | | 250/577 |
| 2010/0095445 | A1 | 4/2010 | Rice et al. |
| 2010/0120648 | A1 | 5/2010 | Veltman et al. |
| 2010/0186156 | A1 | 7/2010 | Ophardt et al. |
| 2010/0192291 | A1 | 8/2010 | Burt et al. |
| 2010/0192295 | A1 | 8/2010 | Fima |
| 2010/0199412 | A1 | 8/2010 | McAlpine |
| 2010/0199415 | A1 | 8/2010 | Fima |
| 2010/0205725 | A1 | 8/2010 | McAlpine |
| 2010/0230333 | A1 | 9/2010 | Avetisian |
| 2011/0010833 | A1 | 1/2011 | Fima |
| 2011/0016619 | A1 | 1/2011 | Keller |
| 2011/0036417 | A1 | 2/2011 | McAlpine |
| 2011/0203048 | A1 | 8/2011 | Fima |
| 2011/0209276 | A1 | 8/2011 | Lu et al. |
| 2011/0219528 | A1 | 9/2011 | Cadavid |
| 2011/0223059 | A1 | 9/2011 | Lu et al. |
| 2011/0252552 | A1 | 10/2011 | Janssen |
| 2011/0296597 | A1 | 12/2011 | Brown et al. |
| 2012/0023649 | A1 | 2/2012 | Helbig et al. |
| 2012/0066822 | A1 | 3/2012 | Kueng |
| 2012/0167295 | A1 | 7/2012 | Fima |
| 2012/0228800 | A1 | 9/2012 | Arora et al. |
| 2012/0317707 | A1 | 12/2012 | Romero |
| 2013/0000766 | A1 | 1/2013 | McAline et al. |
| 2013/0015388 | A1 | 1/2013 | Keller |
| 2013/0031708 | A1 | 2/2013 | Sensel |
| 2013/0067651 | A1 | 3/2013 | Brown et al. |
| 2013/0104305 | A1 | 5/2013 | Stack et al. |
| 2014/0033414 | A1 * | 2/2014 | Kolter ................ A47K 11/12 |
| | | | 4/144.3 |
| 2014/0143944 | A1 * | 5/2014 | Jose .................... A47K 11/12 |
| | | | 4/144.1 |

FOREIGN PATENT DOCUMENTS

| | | |
|---|---|---|
| CA | 2786552 | 5/2011 |
| EP | 1 174 549 | 1/2002 |
| EP | 1 174 549 A2 | 1/2002 |
| EP | 1 174 549 A3 | 1/2002 |
| GB | 0422136 | 7/1933 |
| GB | 0468282 | 12/1935 |
| GB | 0520277 | 8/1938 |
| GB | 0718597 | 3/1951 |
| GB | 0725125 | 11/1953 |
| GB | 0915103 | 7/1961 |
| GB | 1006930 | 10/1961 |
| GB | 1006945 | 4/1962 |
| GB | 1103425 | 5/1965 |
| GB | 1103426 | 5/1965 |

(56) References Cited

FOREIGN PATENT DOCUMENTS

| | | |
|---|---|---|
| GB | 1203608 | 12/1967 |
| GB | 2 153 048 | 8/1985 |
| GB | 2 190 466 | 11/1987 |
| GB | 2 296 309 | 6/1996 |
| GB | 2 320 310 | 6/1998 |
| GB | 2 346 198 | 2/2000 |
| GB | 2 346 198 | 12/2002 |
| GB | 2467669 A | 8/2010 |
| GB | 2469585 A | 10/2010 |
| GB | 2 470 839 A | 12/2010 |
| GB | 2473055 | 3/2011 |
| GB | 2488664 | 9/2012 |
| GB | 2 470 839 B | 1/2013 |
| GB | 2467669 B | 2/2013 |
| GB | 2469585 B | 2/2013 |
| NZ | 0543551 | 11/2005 |
| WO | WO 99 04284 | 1/1999 |
| WO | WO 99/07953 | 2/1999 |
| WO | WO 99/57382 | 11/1999 |
| WO | WO 01/45075 | 6/2001 |
| WO | WO 02 090673 | 11/2002 |
| WO | WO 2004059198 | 7/2004 |
| WO | WO 2004/090245 | 10/2004 |
| WO | WO 2004/100742 | 11/2004 |
| WO | WO 2009/026733 | 3/2009 |
| WO | WO 2009/040524 | 4/2009 |
| WO | WO 2009/040525 | 4/2009 |
| WO | WO 2009/081155 | 7/2009 |
| WO | WO 2009/144479 | 12/2009 |
| WO | WO 2010/074411 | 1/2010 |
| WO | WO 2010/067049 | 6/2010 |
| WO | WO 2010/091862 | 8/2010 |
| WO | WO 2011/061515 | 5/2011 |
| WO | WO 2011/094880 | 8/2011 |
| WO | WO 2011/120177 | 10/2011 |
| WO | WO 2011/120178 | 10/2011 |
| WO | WO 2012/117221 | 9/2012 |
| WO | WO 2013/017373 | 2/2013 |
| WO | WO 2013/017424 | 2/2013 |

OTHER PUBLICATIONS

Notification of International Preliminary Report on Patentability for PCT/US2014/039850; dated Aug. 4, 2016.
International Preliminary Report on Patentability for PCT/US2014/039850; dated Aug. 4, 2016.

\* cited by examiner

VISUAL INDICATOR

CROSS-REFERENCE TO RELATED APPLICATIONS

This application claims the benefit of U.S. Provisional Application No. 61/929,127, filed Jan. 20, 2014, titled "Visual Indicator."

BACKGROUND OF THE INVENTION (1) Field of the Invention

The present invention relates to waterless urinals and, more particularly, to a waterless urinal cartridge that includes a mechanism for indicating a level of precipitate buildup within the cartridge to enable a user to know when to change the cartridge.

(2) Description of Related Art

Water is a scarce and diminishing resource in many areas of the world. It is widely recognized that more has to be done to conserve its usage as populations grow and climates change. Water conserving products are becoming more and more important not only for quality of human life but also for sanitary and subsistence reasons.

There have been many water conserving measures taken all over the world in an effort to deal with limited and diminishing resources. Many municipalities have developed rationing plans while others have invested in waste water recycling treatment and re-use. There have also been many water-conserving products introduced into the marketplace. These products are being more widely used by industry and homeowners as regulations become stricter and the costs of water usage rise.

The non-flushing urinal designs use far less water than the traditional urinals, saving up to 40,000 gallons of water per year from a single urinal. The non-flushing urinals are made of three major components: a porcelain urinal, a housing, and a cartridge. The porcelain urinal component is very similar to a traditional urinal. The housing replaces a traditional P-trap which normally would connect a urinal to the building's plumbing. Thus, the housing sits in-line between the building's plumbing and the bottom of the urinal where the drain pipe would normally connect. The cartridge operates as the P-trap and fits in the housing in a sealed air-tight manner and can be removed for servicing and replacement.

The liquid trap-style cartridge serves two purposes. First, it acts as a barrier from sewer gasses and odors coming into the restroom. Second, it acts as a filter; removing some of the solids that precipitate from human urine (which is a super saturated liquid). Human urine is an aqueous solution of greater than 95% water, with the remaining constituents, in order of decreasing concentration being urea 9.3 g/L, chloride 1.87 g/L, sodium 1.17 g/L, potassium 0.750 g/L, creatinine 0.670 g/L, and other dissolved ions, inorganic and organic compounds according to the NASA Contractor Report No. NASA CR-1802, D. F. Putnam, July 1971.

The liquid trap-style cartridge works by using two mechanisms. First, urine fills the P-trap of the cartridge, forming a barrier against sewer gasses—just as the water does in a traditional P-trapped urinal. Second, a layer of low density fluid, such as oil, can be poured into the trap so that it floats on top of the urine. This floating fluid forms a barrier keeping unpleasant urine smells from entering the bathroom. As a user urinates into the urinal, fresh urine enters the cartridge, sinks through the floating fluid barrier, and presses the old urine out of the trap and out through the housing exit tube and into the building's plumbing.

Though there are significant water saving benefits from using the non-flushing urinals, some drawbacks exist. One of the most significant is the formation of struvite in the pipes, the housing, and the cartridge. Struvite (magnesium ammonium phosphate) is a phosphate mineral with formula: $NH_4MgPO_4 \cdot 6H_2O$. Struvite crystallizes in the orthorhombic system as white to yellowish or brownish-white pyramidal crystals or in platy mica-like forms. It is a soft mineral with a Mohs hardness of 1.5 to 2 and has a low specific gravity of 1.7. It is sparingly soluble in neutral and alkaline conditions, but readily soluble in acidic conditions. In some cases, formation of struvite in the cartridge can be beneficial, as struvite formed in the cartridge is struvite not deposited in the housing or pipes. The cartridge is designed to be easily replaceable, thus its action as a filter is a benefit.

Because the flow of the new fluids (both flushing and/or urine) is affected by the location of the buildup, it is important to note how struvite or other solids build up inside the cartridge. The waterless urinal cartridges are designed to filter solids out of urine and, consequently accumulate buildup over time. This buildup tends to rest mainly on the surfaces where turbulence occurs inside the cartridge and where gravity deposits the heavier-than-urine solids. Thus the cartridge can act as a filter, taking out some solids to avoid them building up in the building's plumbing.

Codes and regulations in many countries also affect cartridge design. In the United States, for example, the plumbing code typically requires a two inch vertical liquid barrier to sewer gasses. Thus, unless another component provides the trap action, the cartridge must be designed to hold a two inch column of water in order to comply with the United States Plumbing Code. Because the trap area is the area most likely to have struvite sediment clog it, it is advantageous for the cartridge (which is easily replaceable) to be the component that provides this two inch gas sealing water column as required by the United States Plumbing Code.

There are a number of different designs of liquid trap cartridges. All United States Plumbing Code compliant models utilize a 2" deep water column to block sewer gas while some utilize a central exit and some utilize a side exit. United States Plumbing Code compliant cartridges similar to those made by Falcon Waterfree Technologies (located at 2255 Barry Avenue, Los Angeles, Calif. 90064, USA) use a central inlet for the fluid to enter and a side or back exit for the fluid to exit the cartridge. Others, similar to the cartridge manufactured and sold under the Waterless brand (Waterless Co., 1050 Joshua Way, Vista, Calif. 92081, USA) utilize inlets spaced away from the center and closer to the perimeter of the cartridge, and a central cartridge exit.

All of these designs have one thing in common—over time, they fill-up with solid sediment from urine and eventually become clogged-up. Once clogged-up, the cartridges need to be replaced. This works well, but has one specific disadvantage: there is no adequate warning system for when the cartridge is full. When the cartridge is full, the urinal often becomes clogged and is left with a pool of urine in the bowl as an indicator that the time has come to replace the cartridge. The replacement of the cartridge in this circumstance can be onerous, as the service person has to deal with the pool of urine in the bowl in order to access the cartridge below. Thus, there is a need for a waterless urinal cartridge lifecycle expiration warning system to assist maintenance personnel in changing cartridges before they become clogged and urine begins to pool. Such warning system would indicate the pending need for a change, prior to the cartridge becoming completely clogged-up.

BRIEF DESCRIPTION OF THE DRAWINGS

The objects, features and advantages of the present invention will be apparent from the following detailed descriptions of the various aspects of the invention in conjunction with reference to the following drawings, where.

SUMMARY OF THE INVENTION

Figure 1A:
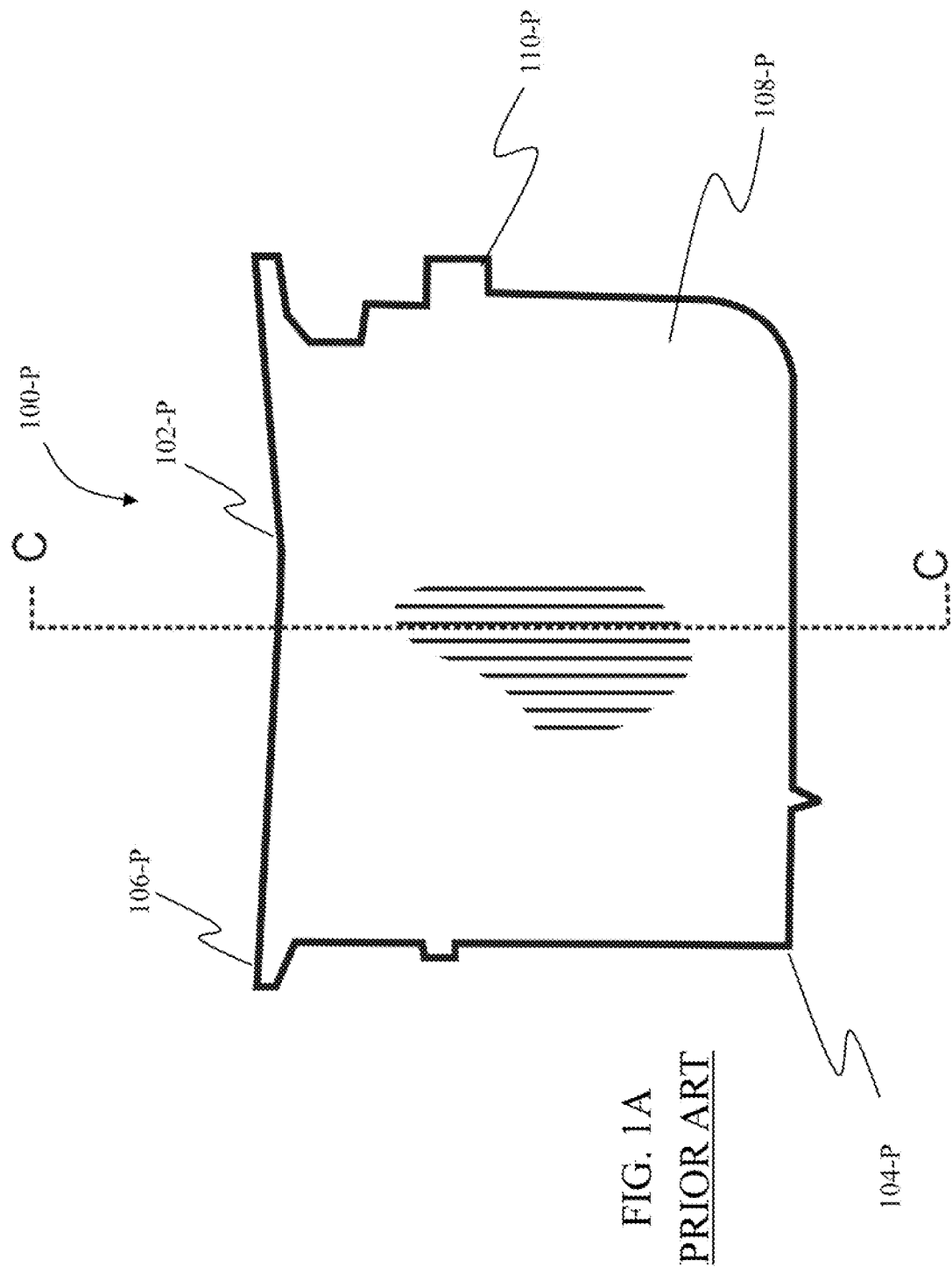
FIG. 1A is side view illustration of a prior art liquid trap cartridge for a waterless urinal.

The present invention relates to waterless urinals, and more particularly to a waterless urinal cartridge that includes a mechanism for indicating a level of precipitate buildup with in the cartridge to enable a user to know when to change the cartridge.

In a first aspect, the present invention teaches a visual indicator for denoting a fluid level in a throat portion of a waterless urinal cartridge. The visual indicator comprises a fluid level indicator disposed in the throat portion of the cartridge; whereby as material buildup occurs inside the cartridge, a corresponding rise in the fluid level in the throat of the cartridge may be seen relative to the indicator.

In another aspect, the visual indicator is a set of markings that indicate the level of the fluid within the throat portion. The visual indicator can also take the form of inserts that indicate the level of the fluid within the throat portion. The visual indicator may also take the form of a reactive material that changes color in response to continual contact with fluid at a predetermined level within the throat portion. The visual indicator may also take the form of an inductive electronic reader resting outside the cartridge that measures a resting fluid level of the cartridge.

In still another aspect, the fluid level indicator is made visible by ultraviolet radiation.

In yet another aspect, the fluid level indicator indicates when the cartridge needs replacement.

In a further aspect, the indicator has an external electronic or electromagnetic fluid level reader, capable of sending a signal when resting fluid level has risen to a predetermined level.

Finally, as can be appreciated by one in the art, the present invention also comprises a method for forming and using the invention described herein.

DETAILED DESCRIPTION

The present invention relates to waterless urinals, and more particularly to a waterless urinal cartridge that includes a mechanism for indicating a level of precipitate buildup with in the cartridge to enable a user to know when to change the cartridge.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. For example, the individual components described may be formed as discrete parts or integrated together as a single unit. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, an introduction is provided to give the reader a general understanding of the present invention. Next, a description of various aspects of the present invention is provided to give an understanding of the specific details.

(1) Introduction

Non-flushing urinals use virtually no water, relying on one of two types of traps to seal out gas and odor, the first is a mechanical trap with a mechanical odor barrier, and the second is a liquid trap with a lighter-than-wastewater liquid barrier.

The present invention is intended to overcome many of the shortcomings associated with the liquid style traps, specifically the ability to introduce flushing water to the urinal without washing away the odor barrier provided by the oil layer which floats on the urine layer.

In order to clearly understand the benefits of the present invention, first features of current systems are presented. For clarity, reference numbers of elements referred to in the prior an figures are affixed with "-P." Corresponding similar elements in figures pertinent to the present invention are not affixed. Thus, for example, reference number 100-P is used to indicate a cartridge housing in prior art figures, whereas reference number 100 is used to indicate a similar element in figures used to show aspects of the present invention.

Figure 1B:
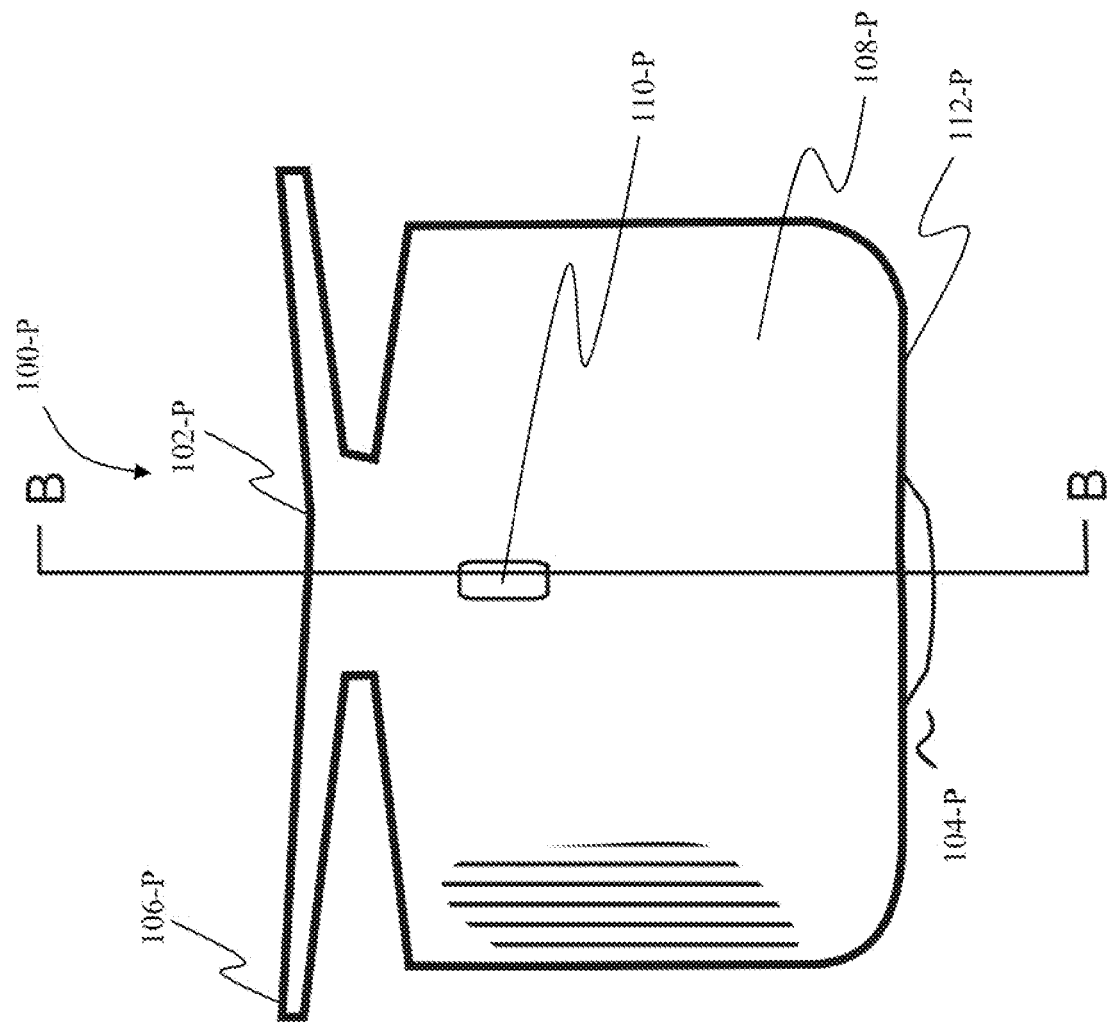
FIG. 1B is a front view illustration of a prior art liquid trap cartridge for a waterless urinal.
Figure 1C:
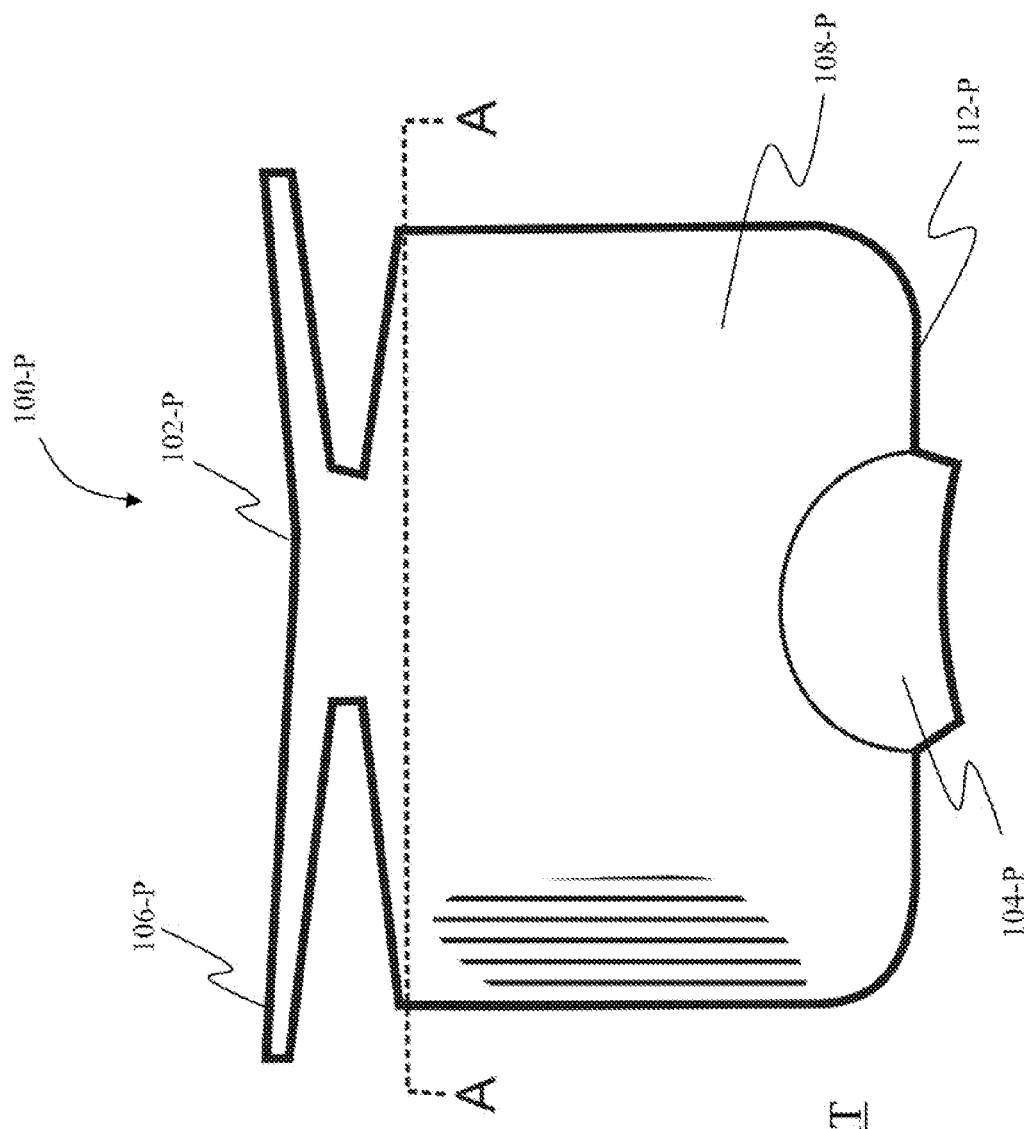
FIG. 1C is a rear view illustration of a prior art liquid trap cartridge for a waterless urinal.

An example of the exterior of a prior art cartridge 100-P is presented in FIGS. 1A to 1C. As shown in FIG. 1A, the cartridge 100-P includes a cartridge inlet 102-P for receiving incoming fluids and a cartridge exit 104-P for passing fluids out of the cartridge. The cartridge 100-P also includes a top wall flange 106-P for sealing the cartridge within a housing or a urinal (not shown). The cartridge 100-P further includes a cartridge side wall 108-P, that generally separates an exterior of the cartridge 100-P from an interior of the cartridge, as well as a locking tine 110-P for locking the cartridge 100-P within a housing or a urinal (again, not shown) and a bottom wall 112-P. The same exterior of the cartridge 100-P is shown in FIG. 1B in a front view and in FIG. 1C in a back view.

Figure 2:
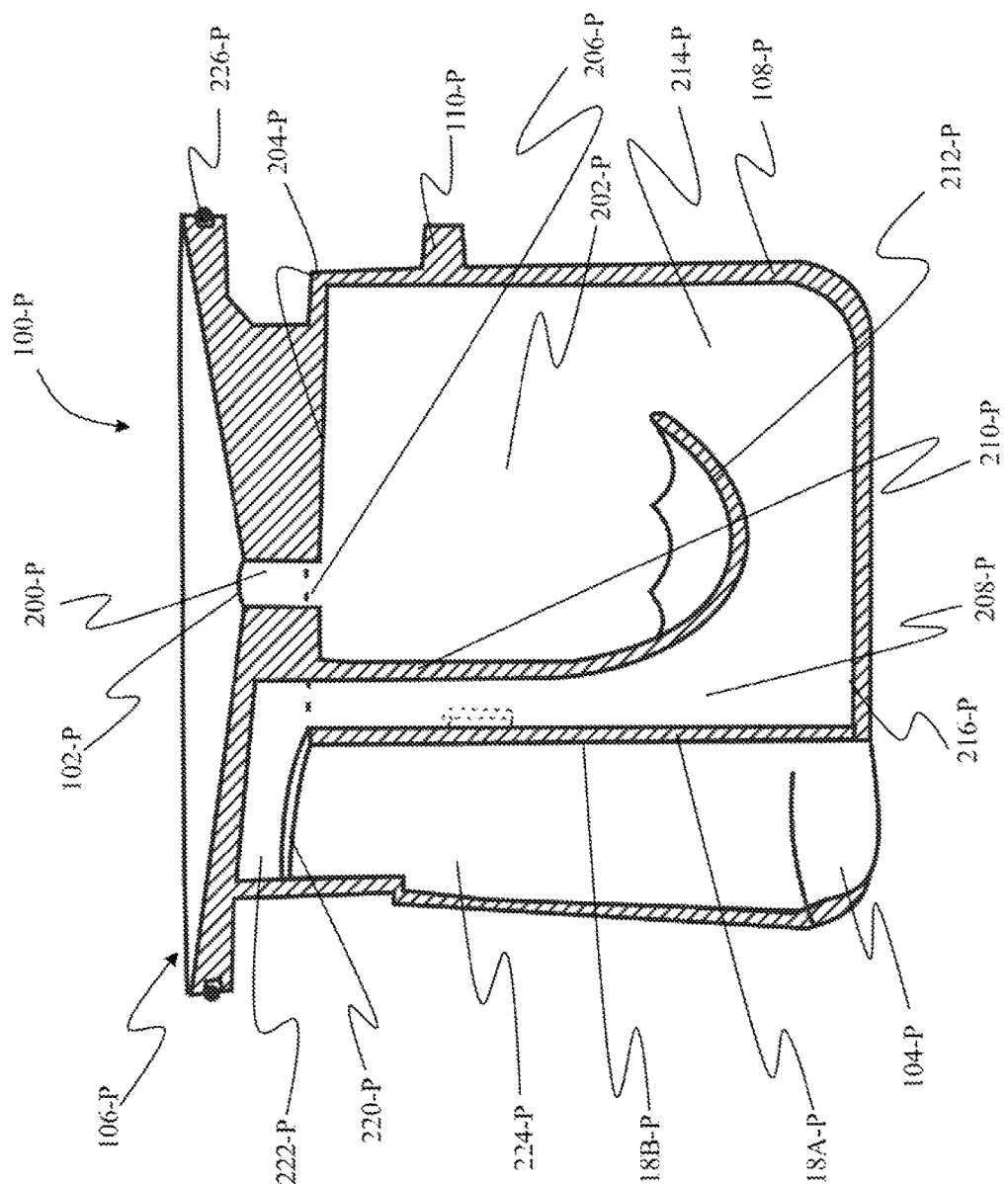
FIG. 2 is a side cross section view illustration of a prior art cartridge such as one sold by Falcon Waterfree Technologies model number C1M2+.

The interior of the cartridge 100-P is shown in a cross-sectional view in FIG. 2, prior to incurring precipitate (e.g, struvite) buildup. After urine passes into the cartridge via the inlet 102-P, it passes through a throat portion 200-P into an inlet compartment 202-P which resides under a ceiling 204-P of the cartridge 100-P. As the urine enters the cartridge 100-P, it passes through a fluid barrier 206-P. The inlet compartment 202-P is separated from an outlet compartment 208-P by a vertical separator 210-P. A baffle 212-P is provided at the bottom end of the vertical separator 210-P. The baffle 212-P serves to capture portions of the fluid barrier 206-P that have been pushed down by urine entering through the throat portion 200-P so that it can float back to rejoin the fluid barrier 206-P. The fluid barrier 206-P is made of a lighter-than-urine fluid, a non-limiting example of which is oil. A side gap 214-P between the baffle 212-P and a cartridge side wall 108-P allows urine to flow around the baffle 212-P and above a bottom wall 216-P to reach the outlet compartment 210-P, which resides between the vertical separator 210-P and an outlet compartment separator wall 218-P which has a first side 218A-P and a second side 218B-P. The urine then rises to an overflow level 220-P, the top of which lies beneath an overflow gap 222-P. After the urine reaches the overflow level 220-P, it passes to a discharge section 224-P of the cartridge 100-P and then flows through the cartridge exit 104-P. The cartridge 100-P also has an O-ring 226-P to form a fluid-tight seal when the cartridge 100-P is placed within a housing (not shown).

Figure 3:
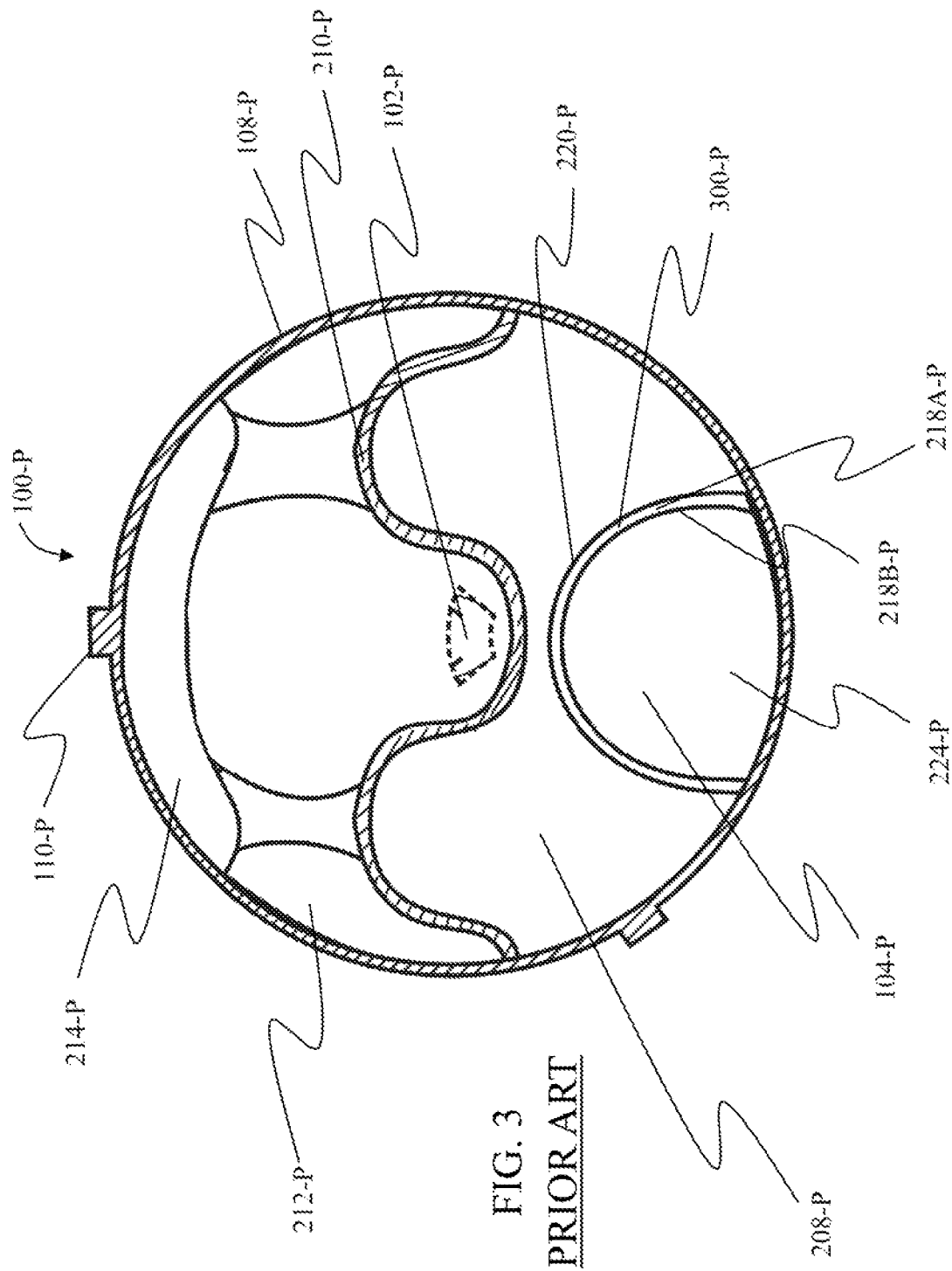
FIG. 3 is a top cross sectional view illustration of a prior art cartridge.
Figure 4:
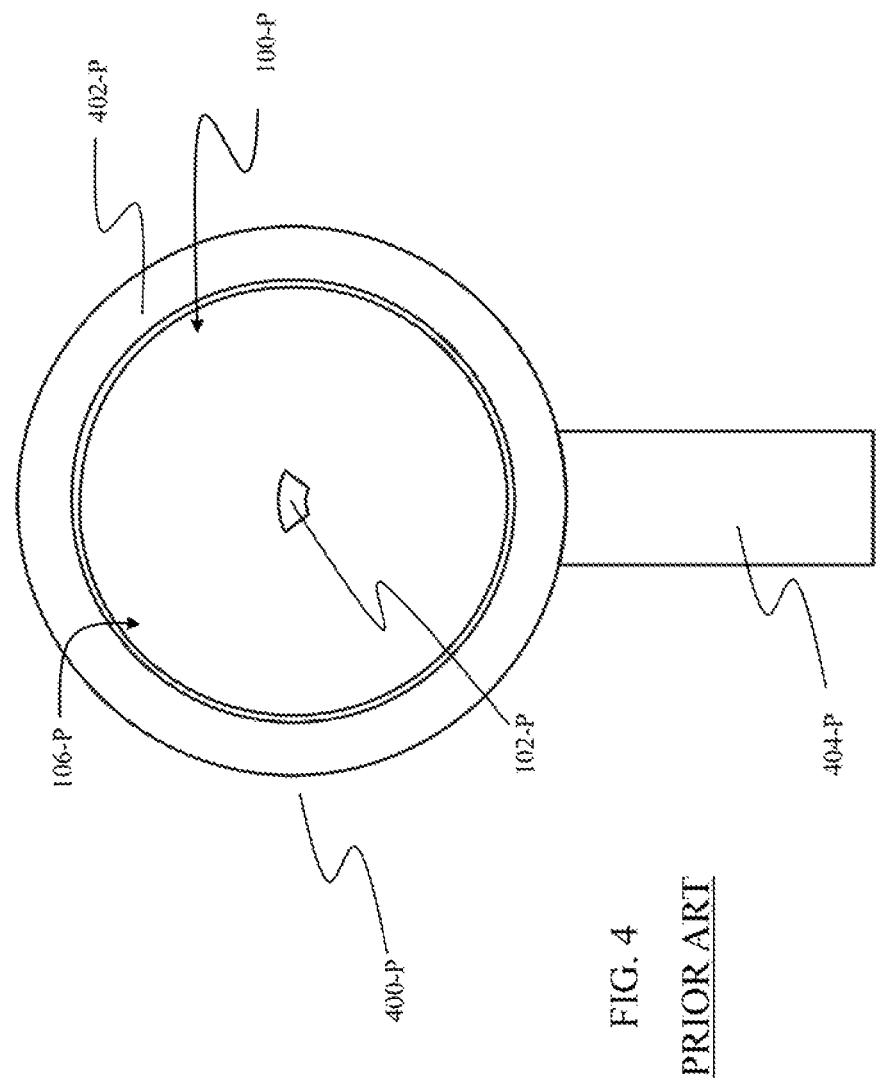
FIG. 4 is a top view illustration of a prior art cartridge for a waterless urinal.

A top cross-sectional view of the cartridge 100-P of FIG. 2 taken at the level of the fluid barrier 206-P is presented in FIG. 3. As can be seen, the outlet compartment separator wall 218-P has an overflow wall top surface 300-P.

A top view of the cartridge 100-P of FIGS. 2 and 3 is shown inserted in a housing body 400-P. The housing body 400-P has a housing flange 402-P which fluidly connects with a porcelain urinal (not shown) to guide urine to the cartridge 100-P. The housing 400-P has an housing exit tube 404-P that receives urine (or another fluid) from the cartridge exit 104-P (not shown) and presents the urine to a building's plumbing (not shown).

As buildup of precipitates occurs on the various parts of the cartridge 100-P, it is difficult for a building's maintenance staff to know when the cartridge 100-P needs replacement. The present invention presents cartridges that include a mechanism for indicating a level of precipitate buildup with in the cartridge to enable a user to know when to change the cartridge, thus eliminating this drawback of prior art cartridges 100-P.

(2) Details of the Invention

Figure 5:
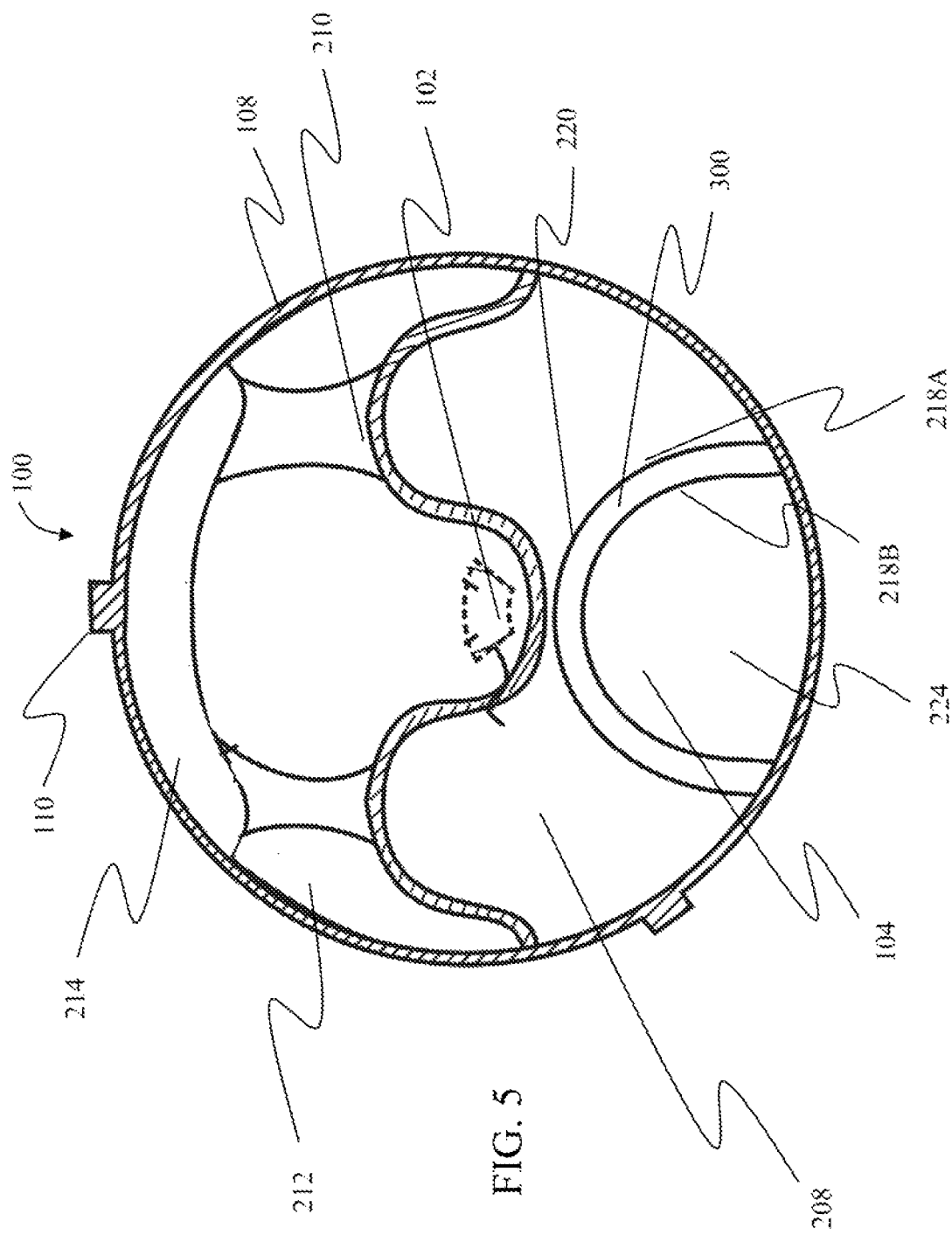
FIG. 5 is a top cross sectional view illustration of a cartridge where the overflow wall is wider than the vertical separator, according to the present invention.

A top cross-sectional view of a cartridge 100 according to the present invention is shown in FIG. 5. This view of is similar to that of FIG. 3 of the prior art cartridge in that it is taken at the level of a fluid barrier 206 within the cartridge 100. In this case, the overflow wall top surface 300 is wider than the width of the outlet compartment separator wall 218. The larger overflow wall top surface 300 provides a larger surface on which buildup/precipitates can settle. As buildup/precipitates settle, the effective height of the separator wall 218 increases, forcing the overall fluid level within the cartridge 100 to rise through the throat portion 200 of the cartridge 100.

Figure 6:
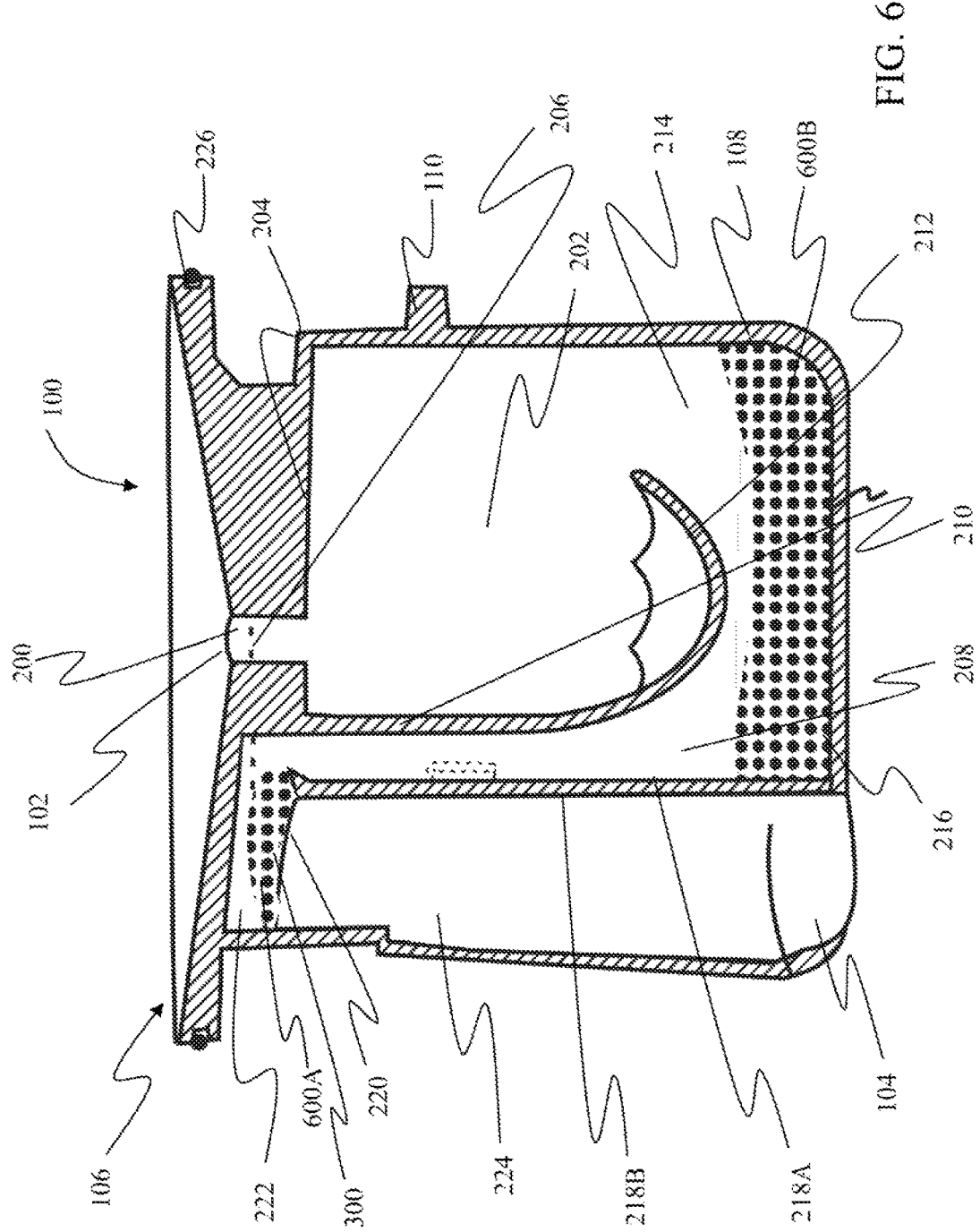
FIG. 6 is a side cross section view illustration of a cartridge where the cartridge is depicted after some use and with some buildup occurring in certain areas of the cartridge, according to the present invention.

A side-cross sectional view of the cartridge 100 of FIG. 5 is shown in FIG. 6. In this case, buildup 600A of precipitates occurs on the wider overflow wall top surface 300 which correspond to the buildup 600B on the bottom wall 216 of the cartridge 100. The relationship of the depth of buildup 600A on the overflow wall top surface 300 versus that on the bottom wall 216 of the cartridge 100 can be used to determine the width of the overflow wall top surface 300 in order to have the fluid level in the throat portion 200 reach a desired level for a particular amount of buildup within the cartridge 100.

Figure 7:
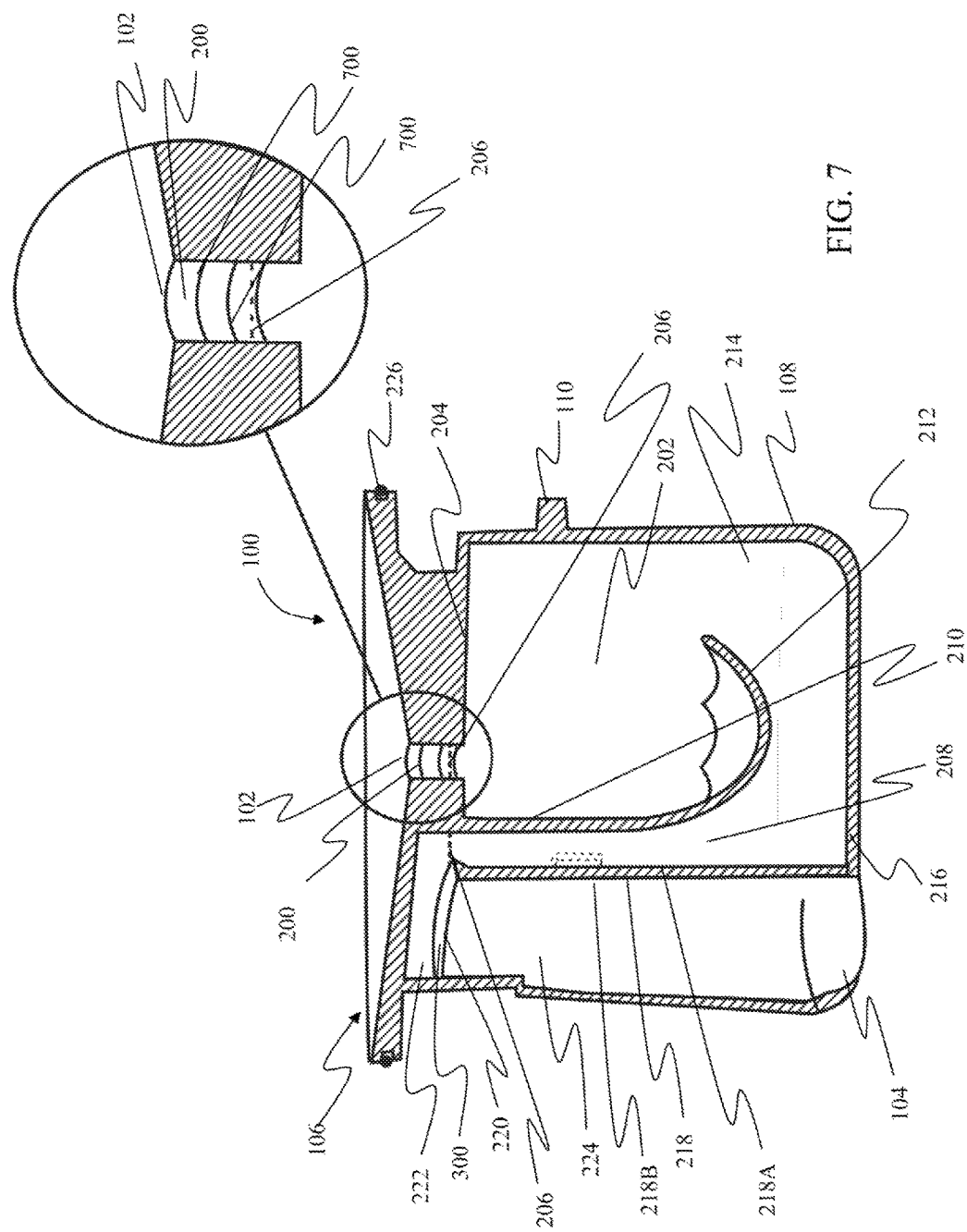
FIG. 7 is a side cutaway view illustration of a cartridge, according to the present invention.

Another cross-sectional view of the cartridge 100 of FIGS. 5 and 6 is shown in FIG. 7. The expanded view on the right hand side shows the throat portion 200 of the cartridge 100 which contains a visual indicator 700. In this non-limiting example, the visual indicator 700 comprises graduated markings. As buildup occurs on the overflow wall top surface 300, the fluid level within the cartridge 100 (generally, the level of the fluid barrier 206) rises into the throat portion 200 and encounters the visual indicator 700 which provides a building's maintenance staff with a visual reference regarding the buildup of precipitates within the cartridge 100, informing them regarding how close the cartridge 100 is to needing replacement.

Figure 8:
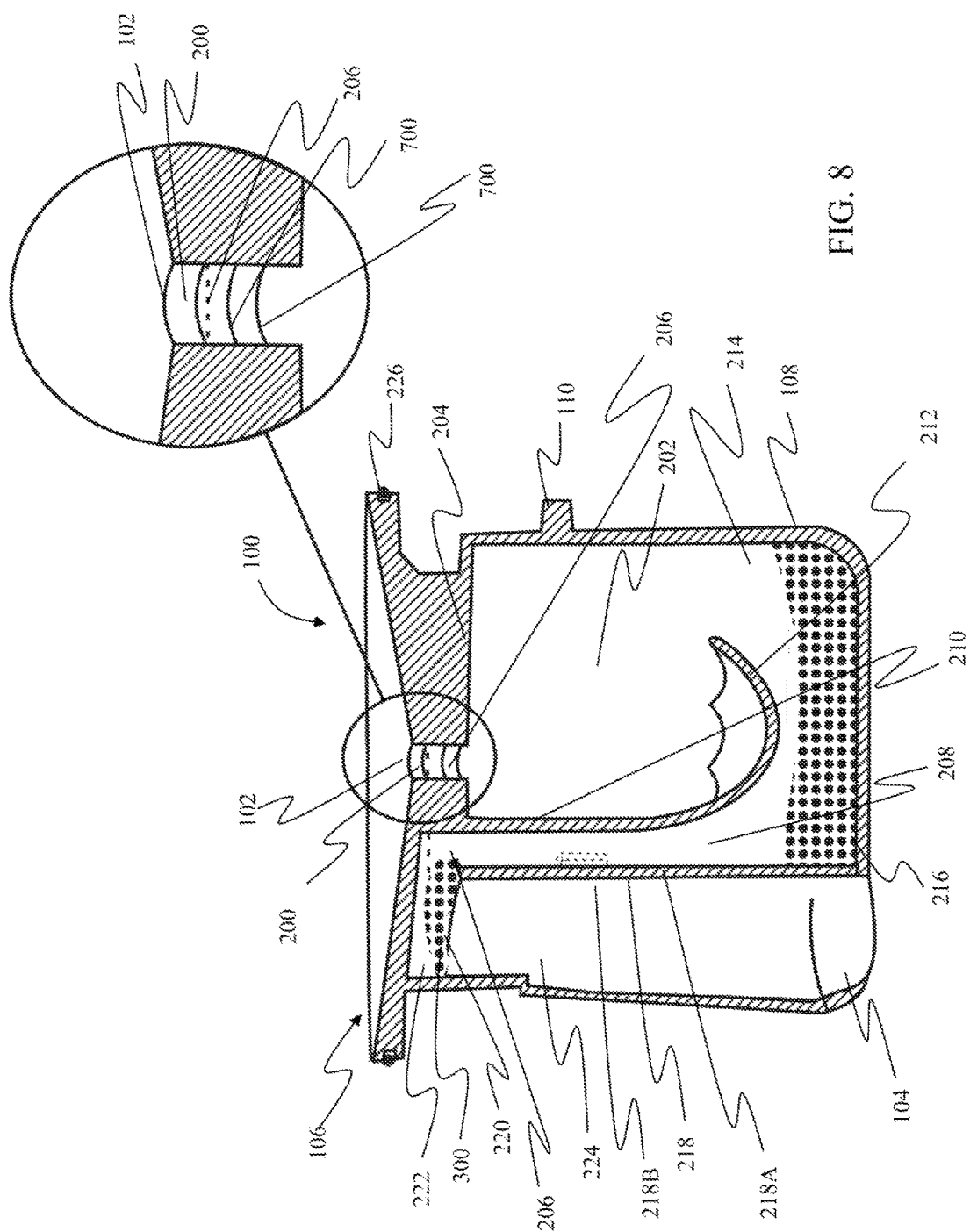
FIG. 8 is a side cutaway view illustration of a cartridge where the resting fluid level can be seen to have risen in the throat due to the buildup that has occurred on the top of the vertical wall, according to the present invention.

Another cross-sectional view of the cartridge 100 of FIG. 7 is shown in FIG. 8, with buildup 600A and 600B. As shown, the buildup 600A proximate the overflow wall top surface 300 causes a corresponding rise in the fluid barrier 206 within the throat portion 200 of the cartridge 100. As the fluid rises, its level adjusts relative to the visual indicator 700 allowing a building's maintenance staff to easily determine whether the cartridge 100 is in need of replacement.

Note that the visual indicator 700 is shown with graduated markings. However, the visual indicator 700 can take any form useful, non-limiting examples of which include colors for graduation, multiple lines for graduation, and upper and lower thresholds.

Figure 9:
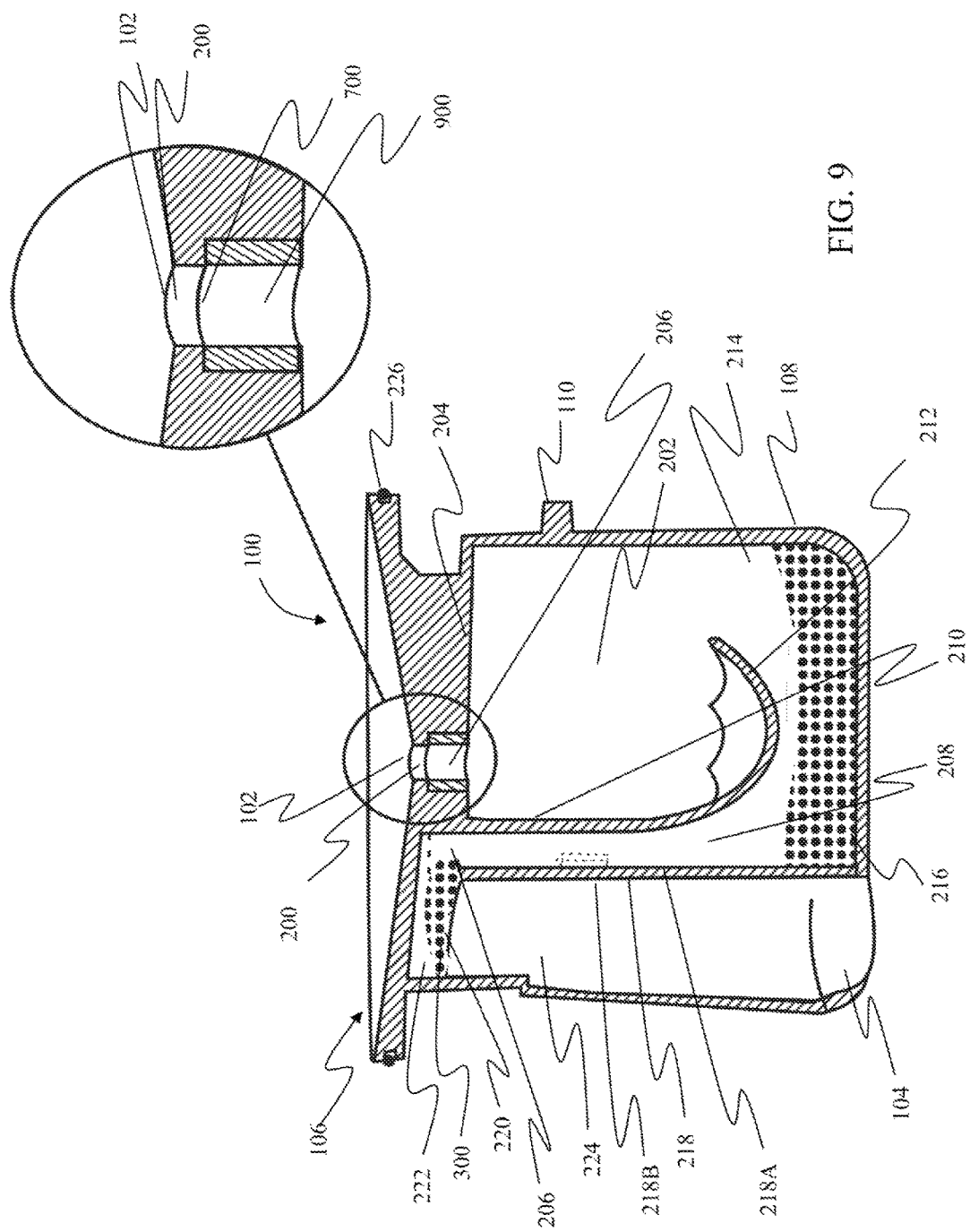
FIG. 9 is a side cutaway view illustration of a cartridge with some buildup and a throat indicator insert, according to the present invention.

Another version of the present invention is shown in the cross-sectional view of the cartridge 100 of FIG. 9, shown with some buildup 600A and 600B. The cartridge 100 here has a throat indicator insert 900. A visual reference is created at the transition between the throat indicator insert 900 and the throat portion 200. The throat indicator insert 900 may be made of a different color, texture, or any other visually different material than the throat portion 200 so that an end user can see the relative level of the fluid barrier 206 (not shown) versus the reference point created at the transition between the throat indicator insert 900 and the throat portion 200.

Figure 10:
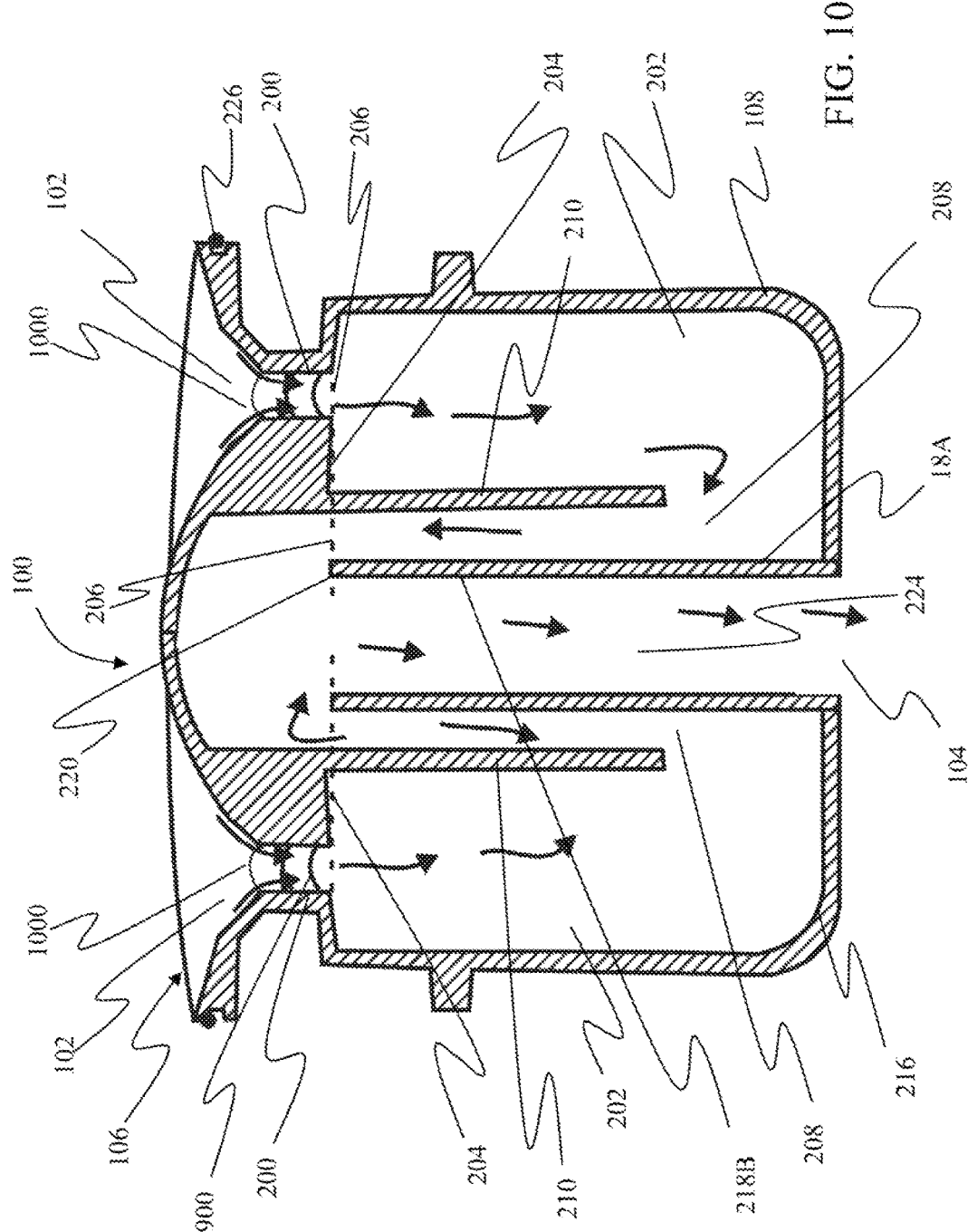
FIG. 10 is a side cutaway view illustration of a cartridge using the inlets, which are distal from the center and proximate to the perimeter of the top flange, according to the present invention.
Figure 11:
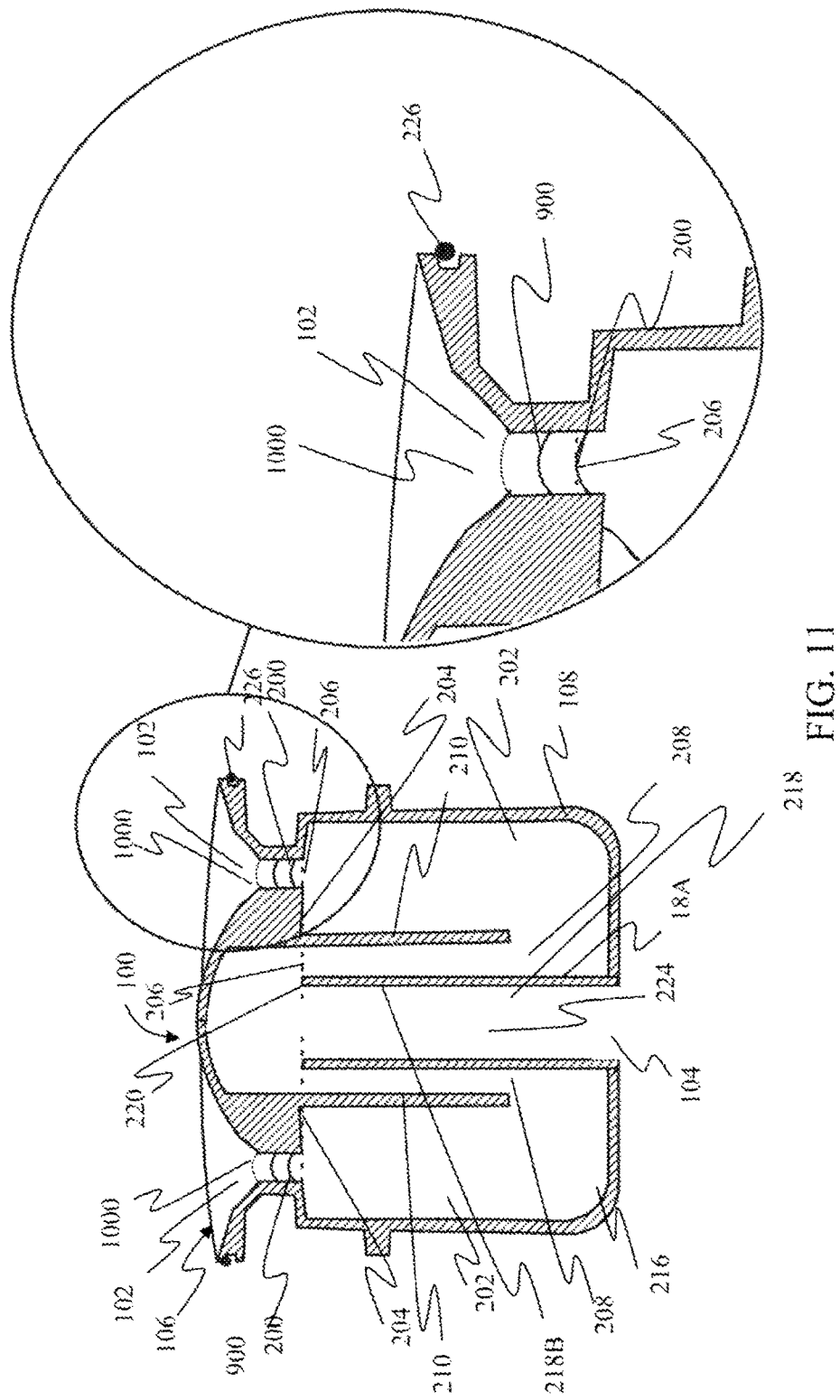
FIG. 11 is a blown-up view of the throat, according to the present invention.
Figure 12:
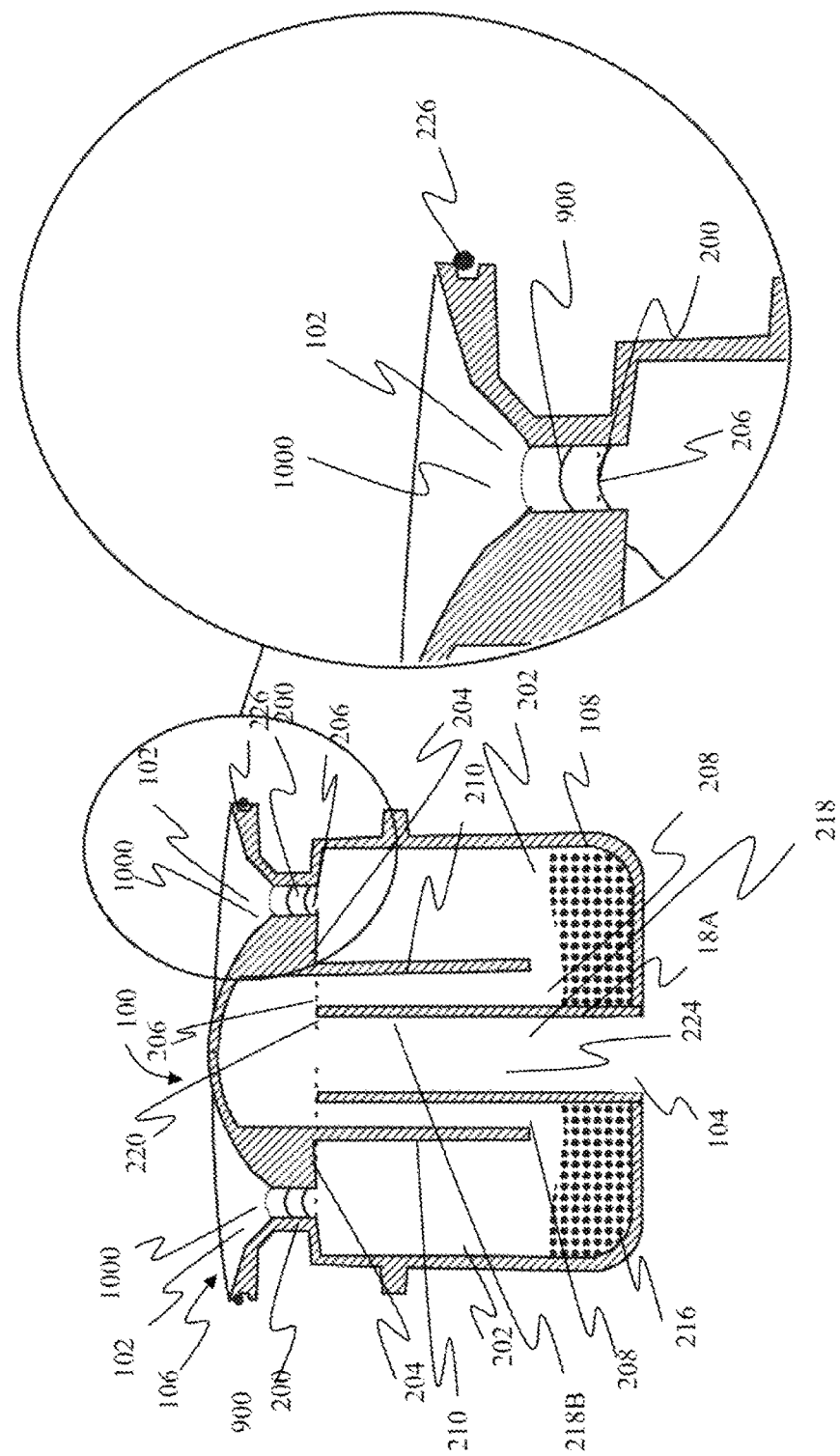
FIG. 12 is a blown-up view of the throat as seen in FIG. 13, this time after some use, according to the present invention.

Another version of the present invention is shown in the cross-sectional view of the cartridge of FIG. 10, where the cartridge includes a plurality of inlets 102 within a top trough 1000. Visual indicators 900 are disposed within the throat portions 200 so that as buildup occurs on the top of the outlet compartment separator wall 218 and the level of the fluid barrier 206 rises within the throat portions 200, an end user can easily determine the level of buildup within the cartridge 100 to determine when the cartridge 100 needs replacement. Another view of the same cartridge 100 is shown in FIG. 11 with a magnified view of the area proximate a throat portion 200 of the cartridge 100. The visual indicator 900 in this cartridge 100 can be any type discussed herein, non-limiting examples including colored markings formed directly onto the cartridge, markings made on the cartridge after manufacturing, inserts, and others, as would be easily understood by one of skill in the art. Also, the overflow top wall surface 300 may include a wide portion on the top of the outlet compartment separator wall 218 to ensure that the level of fluid within the throat portion 200 of the cartridge 100 rises sufficiently as buildup occurs. The same cartridge 100 is shown again in FIG. 12 with buildup 600 on the bottom wall 216 of the cartridge 100. As buildup (not shown) occurs on the top overflow top wall surface 300, the fluid barrier 206 (or other fluid within the cartridge 100) rises into the throat portion 200 where an end user can easily use the visual indicator 900 to determine the level of buildup 600 within the cartridge 100 and/or whether the cartridge 100 needs replacement.

Non-limiting examples of visual indicators 900 include where the visual indicator is selected from a group consisting of markings that indicate the level of the fluid within the throat portion; inserts that indicate the level of the fluid within the throat portion; and a reactive material that changes color in response to continual contact with fluid at a predetermined level within the throat portion. In the latter case, various dyes or other materials that are reactive with water or other urine constituents may be used. Further, it may be desirable to use a fluorescent, but ordinarily difficult to see, material so that the visual indicator 900 is only apparent under a ultraviolet light source.

Figure 13:
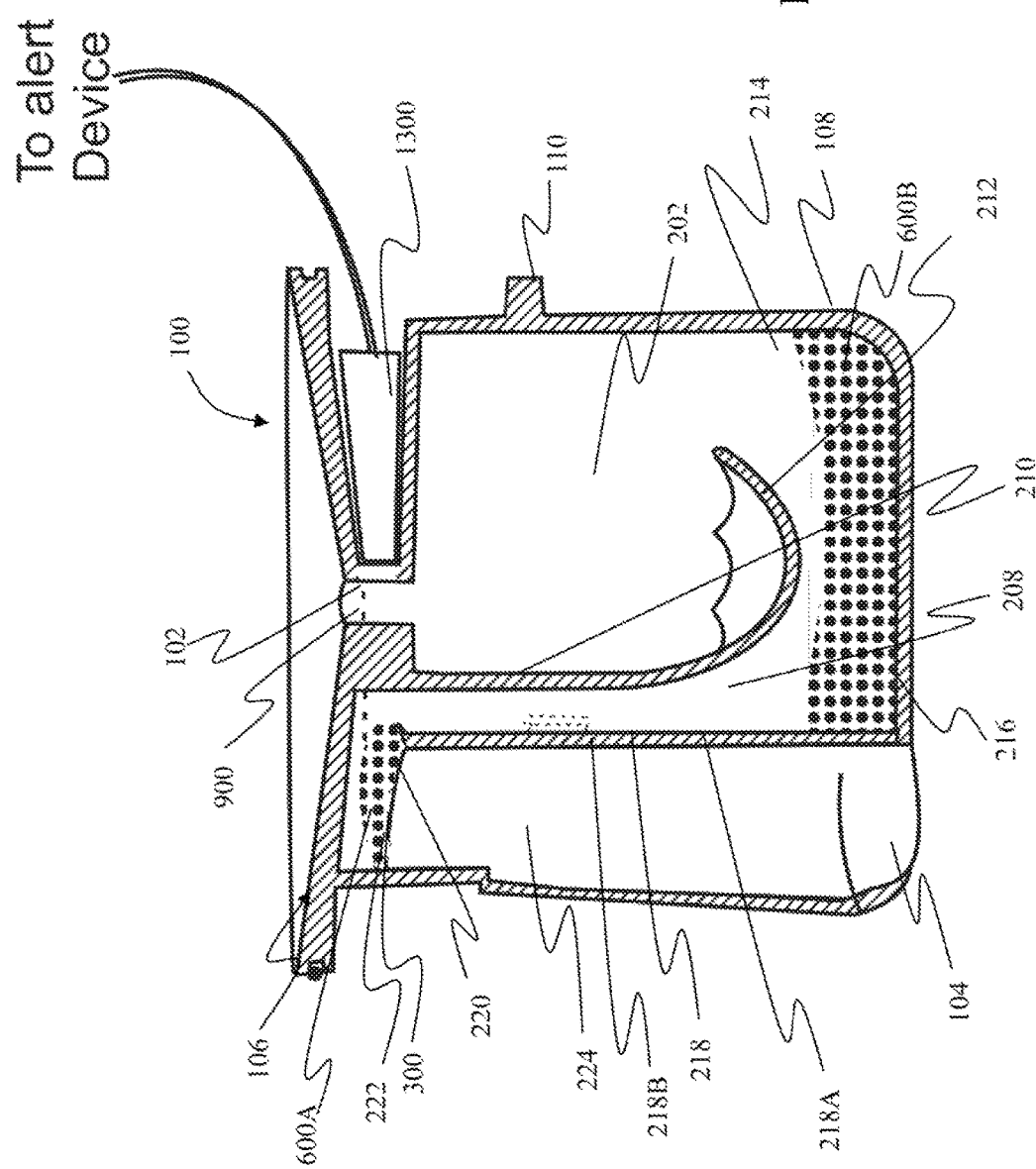
FIG. 13 is an illustration of a cartridge with a replaceable electronic sensor mounted externally and capable of reading fluid level in the throat, according to the present invention.

Another version of the present invention is shown in FIG. 13, where the cartridge 100 has a replaceable electronic sensor 1300 mounted externally and capable of reading the fluid level within the throat portion 200. Non-limiting examples of electronic sensors 1200 that could be used for the present invention include an optical eye operating through a clear section of the throat portion 200 and sensor that functions inductively to measure the resting fluid level. Connection wires 1302 transmit information to an alerting device so that the end user can be warned when the fluid level has reached a certain height within the throat portion 200. As previously shown, buildup 600A on the overflow wall top surface 300 causes the fluid barrier 206 to rise into the throat portion 200, where its presence/level is detected by the electronic sensor 1300. Note that in some cases, the electronic sensor 1300 can transmit data to an alerting device wirelessly and that in some cases, the information transmitted may be transmitted to an offsite receiving device and may contain other information, non-limiting examples of which include usage information and location information.

ELEMENTS LIST

The following list of elements is provided for ease of reference.
100—Cartridge
102—Inlet
104—Cartridge Exit
106—Top Wall Flange
108—Cartridge Side Wall
110—Locking Tine
200—Throat Portion
202—Inlet Compartment
204—Ceiling
206—Fluid Barrier
208—Outlet Compartment
210—Vertical Separator
212—Baffle
214—Side Gap
216—Bottom Wall
218A—Outlet Compartment Vertical Separator (A internal wall)
218B—Outlet Compartment Vertical Separator (B external wall)
220—Overflow Level
222—Overflow Gap
224—Discharge Section
226—O Ring
300—Overflow Wall Top Surface
400—Housing Body
402—Housing Flange
700—Visual Indicator
900—Throat Indicator Insert
1300—Electronic Sensor
1302—Connection Wires

What is claimed is:

1. A cartridge for placement into a waterless urinal, the cartridge comprising:
   an inlet in fluid connection with a cylindrical throat portion, wherein after urine passes into the cartridge via the inlet, it passes through the throat portion into an inlet compartment residing under a ceiling portion of the cartridge, wherein the throat portion is encased in the ceiling portion; and
   a fluid level indicator disposed within the throat portion of the cartridge, where the fluid level indicator comprises markings provided on an interior of the throat portion that indicate the level of the fluid within the throat portion of the cartridge, such that as precipitate buildup occurs inside the cartridge, a corresponding rise in a fluid level in the throat portion of the cartridge is seen relative to the indicator, wherein the cartridge is defined as a filter for removing solids that precipitate from urine, while sealing out sewer gas and odor.

2. The cartridge as set forth in claim 1, where the markings are graduated markings.

3. The cartridge as set forth in claim 1, where the fluid level indicator indicates when the cartridge needs replacement.

4. The cartridge as set forth in claim 2, where the fluid level indicator indicates when the cartridge needs replacement.

5. The cartridge as set forth in claim 1, wherein the markings comprise upper and lower thresholds.

* * * * *